No. 770,795. PATENTED SEPT. 27, 1904.
C. B. BUXTON.
PNEUMATIC TIRE COVER.
APPLICATION FILED JULY 13, 1903.
NO MODEL.

Witnesses.
W. Bealle Williams.
J. C. Hutchinson Jr.

Inventor.
Charles B. Buxton
By his attys.
Pennie & Goldsborough

No. 770,795. Patented September 27, 1904.

UNITED STATES PATENT OFFICE.

CHARLES BURDON BUXTON, OF PALMERSTON NORTH, NEW ZEALAND.

PNEUMATIC-TIRE COVER.

SPECIFICATION forming part of Letters Patent No. 770,795, dated September 27, 1904.

Application filed July 13, 1903. Serial No. 165,299. (No model.)

*To all whom it may concern:*

Be it known that I, CHARLES BURDON BUXTON, a subject of the King of Great Britain, residing at Palmerston North, in the Colony of New Zealand, have invented a new and useful Improvement in Pneumatic-Tire Covers; and I do hereby declare the following to be a full, clear, and exact description of the same.

This invention has been designed for the purpose of providing a cover for the pneumatic tires of cycles, motor-cars, or the like that will last much longer than the ordinary type of cover and also be less susceptible to puncture. In such ordinary type of covers a fabric or cotton webbing is embedded in the rubber of which the cover is composed. This webbing is liable to rot quickly, owing to surrounding influences, thus rendering the cover very susceptible to bursting through the pressure of the inside tube or to being punctured by small obstacles in its course.

The invention consists in forming the cover of an outer and inner layer of rubber, with a sheet of fine wire-gauze placed between them, and the whole solidified together by vulcanizing.

Figure 1:
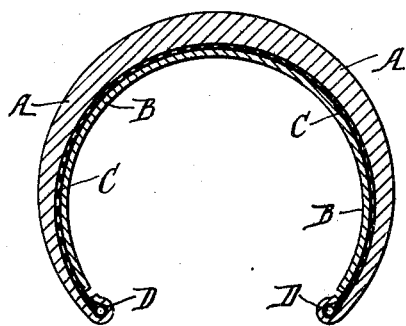
Figure 2:
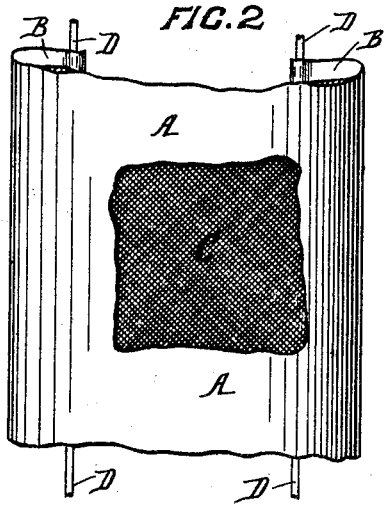

In the accompanying drawings, which illustrate the invention, Figure 1 is a cross-sectional elevation of the cover. Fig. 2 is a plan of portion of the same with a small piece of the outside layer torn away to show the wire-gauze.

The cover is composed of an outer layer of rubber A, that is shaped to the ordinary shape, and of a thin inner layer B of the same material. Between the two layers A and B is placed a sheet of fine wire-gauze C, composed of aluminium, steel, or other suitable resilient material. This wire-gauze before being placed between the layers may be subjected to any approved treatment that will render it impervious to oxidation. The edges of the wire-gauze sheet C are secured to wires D, running round throughout the circumference of the cover, and the edges of the layer A are brought round and turned over the wires, so as to form a bulb on the edges of the cover. After the layers have been thus placed in position they are submitted to the necessary operations to vulcanize them to the desired degree, so that the wire-gauze sheet shall become firmly embedded in the cover and the whole shall be thoroughly annealed. The wires D will serve to keep the cover in position upon the tire and upon the rim of the wheel.

What I claim as my invention, and desire to secure by Letters Patent, is—

In pneumatic-tire covers, an outer and an inner layer of rubber, a sheet of wire-gauze between said layers and extending throughout the width of the cover, and wires extending around the circumference of each edge of the cover and secured to the edges of the gauze-sheet, the whole being vulcanized together to form an integral structure.

In testimony whereof I have signed this specification in the presence of two subscribing witnesses.

CHARLES BURDON BUXTON.

Witnesses:
 WILLIAM MOFFATT,
 FRED DOWNEY.